United States Patent Office 2,961,439
Patented Nov. 22, 1960

2,961,439

DEXTRAN ETHER FORMALDEHYDE REACTION PRODUCT

Leo J. Novak, Dayton, Ohio, assignor, by mesne assignments, to Midland Chemical Corporation, Dayton, Ohio, a corporation of Delaware No Drawing. Filed Nov. 24, 1954, Ser. No. 471,126

2 Claims. (Cl. 260—209)

This invention relates to reaction products of carboxymethyl dextran and formaldehyde and to a method of making the same.

The object of the invention is to produce a new series of dextran derivatives useful as coating and impregnating materials, as adhesives, and for other purposes in which water-resistance is desirable.

Another object of the invention is to modify carboxymethyl dextran by reaction with formaldehyde to thereby obtain new dextran-derived products to be used in the formation of water and oil-resistant films, filaments and other shaped objects.

Carboxymethyl dextran is a new product which may be obtained by the method described in the pending application of L. J. Novak et al., Ser. No. 638,889, filed December 3, 1956, which is a continuation-in-part of application 346,016, filed March 31, 1953, now abandoned. As described in said application, the selected dextrane and a carboxymethylating agent are reacted together in an aqueous alkaline medium whereby the carboxymethyl group is substituted for one or more hydroxyl groups of the dextran, with production of an ether. Suitable carboxymethylating agents are chloracetic acid, sodium chloracetate or chloracetamide, reaction thereof with the dextran being carried out in an aqueous solution of a strong alkali metal hydroxide such as sodium, potassium or lithium hydroxide. Preferably, the dextran, in aqueous solution or suspension, is treated with an excess of sodium or potassium chloracetate containing an excess of sodium or potassium hydroxide at a temperature of 50° C. to 100° C. for ten minutes to two hours. The molar ratio of sodium chloracetate or potassium chloracetate to dextran may be between 2:1 and 12:1, the molar ratio of sodium or potassium hydroxide to dextran between 5:1 and 15:1, the molar ratio of the water to dextran between 70:1 and 120:1. The carboxymethyl dextrans obtained under these conditions have a D.S. (degree of substitution or average number of carboxymethyl groups per anhydroglucopyranosidic unit) of 0.2 to 3.0.

The reaction product is a viscous mass comprising the sodium or potassium salt of the carboxymethyl dextran, from which the salt may be precipitated by means of any water-miscible alcohol or ketone such as methyl, ethyl, propyl, isopropyl or t-butyl alcohol or acetone.

The free carboxymethyl dextran may be recovered from the salt by mixing the latter with water, acidifying to pH about 2.0 and precipitating the ether from the acid medium by addition of a water-miscible alcohol or ketone as mentioned above. The pH of 2.0 is not critical and the ether may be precipitated at other pH values on the acid side. However, the highest yields of the free ether have been obtained by precipitating it at pH 2.0.

The dextran carboxymethylated may be obtained in various ways. Usually, it is biosynthesized from sucrose by the action of microorganisms of the *Leuconostoc mesenteroides* or *L. dextranicum* types or enzymes separated from the cultures of the microorganisms. Microorganisms or their enzymes which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The procedure is to inoculate the aqueous sucrose-bearing nutrient medium with a culture of the microorganism, or with the enzyme filtered from the culture, incubate the mass until the dextran is produced in maximum yield, and then precipitate the dextran from the fermentate by addition thereto of a water-miscible alcohol or ketone. The precipitate is "native" dextran normally characterized by very high molecular weight calculated to be in the millions. It may be suitably purified and reduced to powder form for reaction with the carboxymethylating agent, or it may be partially hydrolyzed in any suitable way to a dextran of lower molecular weight, prior to the reaction. In general, the dextran may have a molecular weight of 5000 to $150 \times 10^6$ determined by light scattering measurements.

In order for the carboxymethyl dextrans to react with formaldehyde, with probable formation of acetal-type linkages between dextran chains, the carboxymethyl dextran must contain some free hydroxyl groups and therefore the conditions of the carboxymethylation as set forth above are selected so that the ether contains an average of 0.2 to not more than 2.0 carboxymethyl groups per AGU.

The aldehyde-modified (apparently cross-linked) carboxymethyl dextran resulting from reaction of the aldehyde and ether under acidic conditions and, usually, at elevated or curing temperature is characterized by hydro-durability and can be used to impart that property to various materials, or formed into shaped articles having the property as an inherent characteristic.

The reaction between the carboxymethyl dextran and formaldehyde may be effected by treating the dextran ether with a readily soluble or volatile form of formaldehyde and, preferably with the commercially available formaldehyde solution known as formalin and containing about 60% of water. The reaction is carried out at acid pH, preferably at pH about 3 to 4, this pH being attained by inclusion of an acid or acid reacting substance, such as a mineral acid like hydrochloric or sulfuric, an organic acid such as lactic acid, or an acid reacting substance such as an acid salt or acid reacting salt of the type of sodium bisulfate, aluminum sulfate or acetyl chloride.

One method of producing the carboxymethyl dextran is to mix the particulate ether, acid or acid reacting substance and formalin (water—60%) to obtain a paste and then evaporating the water, at ordinary or elevated temperatures, thereby increasing the concentration of the acid to obtain the desired pH for effecting reaction between the formaldehyde and dextran ether, and bringing about the reaction either at ordinary room temperature or at elevated temperature.

The acidic paste prepared initially may be applied as such or after dilution with water to various substrates and heated to fix the formaldehyde dextran ether reaction product thereon, and the acid or acid reacting substance used to adjust the pH to the acid value at which reaction of the formaldehyde and carboxymethyl dextran may be selected so that the conditions are best adapted to the particular material being treated. For example, if the aqueous acidic medium comprising the ether and aldehyde is to be applied to and the ether and aldehyde reacted on a fabric which is liable to deterioration in the presence of a strong acid such as hydrochloric or sulfuric, a milder acid such as oxalic may be selected for facilitating the chemical reaction since larger amounts of oxalic acid may be used without harmful effect on such fabrics as those comprising regenerated cellulose and various other acid-sensitive fiber-forming materials. The acid reacting salt may also be selected with use of the paste or fluid composition in view. Thus, the composition may be applied to paper, for sizing it and rendering it water-resistant, and since aluminum sulfate is commonly used in relatively large amounts in the manufacture of paper, that acid reacting salt may be used for facilitating reaction of the formaldehyde and carboxymethyl dextran on the paper.

The chemical reaction may be completed at ordinary temperature if sufficient time is allowed, but usually it is desirable to effect the reaction under heating at elevated or curing temperature. The temperature may be from 70° C. to 150° C. for times varying inversely with the temperature between 5 minutes and two hours.

The final product may be in pulverulent or granular form and suitable for use as an adhesive, as for instance as a bonding material for plywood, it may be in the form of filaments, films or sheets, or it may be brought to water-resistant or insoluble condition in situ on a base.

The following examples are illustrative of specific embodiments of the invention, it being understood that these examples are not given as limitative.

*Example I*

About 10 parts of substantially anhydrous carboxymethyl dextran derived from native unhydrolyzed microbiologically produced dextran containing an average of about 1.8 carboxymethyl groups per AGU is mixed with 5 parts by weight of formalin.

About 1.0% part of 1.0% aqueous hydrochloric acid is added. When the resulting composition is used as adhesive in the preparation of plywood and subjected to heat (120° C.) and pressure cure treatment at the low pH of about 3.0, a lasting water-resistant bond is obtained.

*Example II*

About 10 parts of substantially anhydrous carboxymethyl dextran derived from L. m. B-512 hydrolyzed dextran (M.W. average 60,000 to 80,000) and containing an average of about 1.0 carboxymethyl groups per AGU are mixed with about 5.0 parts by weight of formalin and sufficient oxalic acid to adjust the pH to 2.0 to 4.0. The resulting paste is extended with water to render it more fluid and applied to a regenerated cellulose fabric. The excess treating fluid is removed and the fabric is heated at 120° C. for 5 minutes to complete reaction of the carboxymethyl dextran and formaldehyde.

*Example III*

To a syrupy 20% aqueous solution of carboxymethyl dextran derived from "clinical" dextran and having an average D.S. of 1.0, there is added an equal volume of 30% formaldehyde. The mixture is heated at pH 5-6 for one half hour at a temperature just below the boiling point. The residual product from the water evaporation is more insoluble and resistant to water than the starting carboxymethyl dextran reactant.

Carboxymethyl ethers of other dextrans having a D.S. varying between 0.2 and 2.0 may be reacted to obtain products of more or less pronounced hydrodurability.

Since changes and variations may be made in details in practicing the invention without departing from its spirit and scope, it is to be understood that it is not intended to limit the invention except as defined in the appended claims.

What is claimed is:

1. A reaction product of carboxymethyl dextran and formaldehyde obtained by maintaining an aqueous acidic mixture of carboxymethyl dextran containing an average of 1.0 to about 2.0 carboxymethyl groups per anhydroglucose unit and formaldehyde at a temperature between room temperature and 150° C. until the formaldehyde is reacted with the carboxymethyl dextran as evidenced by increased hydrodurability of the product as compared to the hydrodurability of the starting carboxymethyl dextran.

2. A reaction product of carboxymethyl dextran and formaldehyde obtained by maintaining an aqueous acidic mixture of carboxymethyl dextran containing an average of 1.0 to about 2.0 carboxymethyl groups per anhydroglucose unit and formaldehyde at a temperature of 70° C. to 150° C. for a time varying inversely with the temperature between 5 minutes and two hours.

References Cited in the file of this patent

UNITED STATES PATENTS

| | | |
|---|---|---|
| 2,523,709 | Moe | Sept. 26, 1950 |
| 2,602,082 | Owen | July 1, 1952 |
| 2,609,368 | Gaver | Sept. 2, 1952 |
| 2,618,633 | Vaughan | Nov. 18, 1952 |

OTHER REFERENCES

Pigman et al.: "Carbohydrate Chemistry" published by Academic Press (N.Y.), 1948 (pages 224, 225, 557 and 558 relied on).